(12) United States Patent
Elam

(10) Patent No.: US 10,947,386 B2
(45) Date of Patent: Mar. 16, 2021

(54) METHOD AND SYSTEM OF ANTI-STRIPPING PROCESS USING ORGANOSILANES AND LIME TO MANUFACTURE ASPHALT

(71) Applicant: Matthew Paul Elam, Englewood, CO (US)

(72) Inventor: Matthew Paul Elam, Englewood, CO (US)

(*) Notice: Subject to any disclaimer, the term of this patent is extended or adjusted under 35 U.S.C. 154(b) by 0 days.

(21) Appl. No.: 16/059,990

(22) Filed: Aug. 9, 2018

(65) Prior Publication Data
US 2020/0048465 A1   Feb. 13, 2020

(51) Int. Cl.
| | |
|---|---|
| *C08L 95/00* | (2006.01) |
| *C08K 5/5419* | (2006.01) |
| *C08K 5/05* | (2006.01) |
| *C08K 3/30* | (2006.01) |
| *C08K 3/34* | (2006.01) |
| *C08K 3/22* | (2006.01) |

(52) U.S. Cl.
CPC ............ *C08L 95/00* (2013.01); *C08K 3/22* (2013.01); *C08K 3/30* (2013.01); *C08K 3/34* (2013.01); *C08K 5/05* (2013.01); *C08K 5/5419* (2013.01); *C08K 2003/2206* (2013.01); *C08K 2003/3045* (2013.01)

(58) Field of Classification Search
USPC .............................................. 106/276, 284.3
See application file for complete search history.

(56) References Cited

U.S. PATENT DOCUMENTS

| | | |
|---|---|---|
| 2,570,185 A | 10/1951 | Aldrich |
| 2,937,580 A | 5/1960 | Spalding et al. |
| 5,006,012 A | 4/1991 | Sterner |
| 5,232,306 A | 8/1993 | Sterner |
| 5,405,213 A | 4/1995 | O'Connor |
| 5,567,764 A | 10/1996 | Brasseur et al. |
| 5,584,597 A | 12/1996 | Lemelson |
| 6,074,128 A | 6/2000 | Marino |
| 6,619,882 B2 | 9/2003 | Harvey |
| 7,704,561 B2 | 4/2010 | Mehta et al. |
| 7,815,725 B2 | 10/2010 | Reinke et al. |

(Continued)

OTHER PUBLICATIONS

Gupta, et al, "Comparative study on The Behavior of Bituminous Concrete Mix and Warm Mix Asphalt Prepared Using Lime and Zycotherm as Additive," Materials Today: Proceedings 5 (2018) 2074-2081 (Second International Conference on Materials Science (ICMS 2017) (c) 2017 Elsevier Ltd. (Year: 2017).*

(Continued)

*Primary Examiner* — Fred M Teskin
(74) *Attorney, Agent, or Firm* — Sheridan Ross P.C.

(57) ABSTRACT

Embodiments of the present disclosure are generally related to asphalt compositions, and particularly to enhanced asphalt compositions and methods and systems for manufacturing the same. The enhanced asphalt compositions include both a silane additive and a calcium composition. The silane additive includes benzyl alcohol and at least one organosilane. The enhanced asphalt compositions of the present invention have improved anti-stripping properties, but the quantities of calcium composition and silane additive required are less than the quantities necessary to prepare previously known asphalt compositions with improved anti-stripping properties.

20 Claims, 3 Drawing Sheets

(56) References Cited

U.S. PATENT DOCUMENTS

| | | |
|---|---|---|
| 7,968,627 B2 | 6/2011 | Reinke et al. |
| 7,981,466 B2 | 7/2011 | Reinke et al. |
| 8,679,245 B2 | 3/2014 | Reinke et al. |
| 8,734,581 B2 | 5/2014 | Reinke et al. |
| 9,175,446 B2 | 11/2015 | Reinke et al. |
| 9,394,652 B2 | 7/2016 | Reinke et al. |
| 9,739,021 B1 | 8/2017 | Kuhn et al. |
| 10,093,578 B2 | 10/2018 | Elam |
| 2004/0116557 A1 | 6/2004 | Pounds et al. |
| 2010/0222449 A1 | 9/2010 | Noda et al. |
| 2012/0022182 A1* | 1/2012 | Ranka ............ C08L 95/00 523/351 |
| 2013/0276668 A1 | 10/2013 | Ranka et al. |
| 2016/0130474 A1 | 5/2016 | Dongre |
| 2016/0376440 A1 | 12/2016 | Naidoo et al. |
| 2017/0298579 A1 | 10/2017 | Kuhn et al. |
| 2019/0039952 A1 | 2/2019 | Elam |

OTHER PUBLICATIONS

Raju, et al, "Experimental Studies on Bituminous Mixes by Using Zycotherm," International Journal of Scientific Development and Research (IJSDR), vol. 3, Issue 1, Jan. 2018. (Year: 2018).*
Official Action for U.S. Appl. No. 15/637,051, dated Feb. 13, 2018, 13 pages.
Notice of Allowance for U.S. Appl. No. 15/637,051, dated Jun. 4, 2018, 7 pages.
Official Action for U.S. Appl. No. 16/154,464, dated Nov. 8, 2018, 15 pages.
Notice of Allowance for U.S. Appl. No. 16/154,464, dated Mar. 21, 2019, 7 pages.
Official Action for U.S. Appl. No. 16/459,313, dated Jul. 19, 2019 8 pages.

* cited by examiner

METHOD AND SYSTEM OF ANTI-STRIPPING PROCESS USING ORGANOSILANES AND LIME TO MANUFACTURE ASPHALT

FIELD OF THE INVENTION

The present disclosure is generally directed to the manufacture of asphalt, and particularly to methods and systems for preventing or reducing asphalt stripping by using organosilanes and hydrated lime, dry lime, or other anhydrous material in the asphalt manufacturing process.

BACKGROUND OF THE INVENTION

A common problem in the manufacture and use of hot-mix asphalt (HMA) is the loss of adhesion between the aggregate surface and the asphalt binder in the presence of moisture, known in the art as "stripping." Stripping is a significant concern in the art not only because it results in a loss of strength of the HMA, but because it may occur even where it is not visually evident due to water's effect on the cohesive strength of the asphalt binder. The terms "water susceptibility" and "water sensitivity," and similar terms, are often used in the art to refer to the loss of strength or other undesirable physical and chemical changes of HMA in the presence of moisture.

The water susceptibility of HMA depends on many variables, including but not limited to various physical and chemical properties of the aggregate and/or asphalt binder, mixture characteristics, local climate, traffic patterns, construction practices, and pavement design considerations. Of these variables, the physical and chemical properties of the aggregate usually have the greatest effect on the water susceptibility of an HMA; generally, an aggregate-related water susceptibility problem cannot be overcome by selecting an asphalt binder with better anti-stripping properties.

To reduce the moisture sensitivity and susceptibility to stripping of HMA, those of skill in the art have long employed various anti-stripping additives in the HMA manufacturing process, including but not limited to liquid additives (e.g. amines, diamines, and polymers), Portland cement, fly ash, and flue dust. Perhaps the most common anti-stripping additive, however, is calcium hydroxide (Ca(OH)$_2$), usually known in the art as hydrated lime or slaked lime, which is most commonly obtained by mixing ("slaking") calcium oxide (CaO, "lime" or "quicklime") with water. In the manufacture of HMA, hydrated lime may be added either in solid form or as "limewater," a saturated solution of hydrated lime in water. In addition to its anti-stripping properties, the use of hydrated lime in HMA has other benefits. For example, the hydrated lime can act as a mineral filler to stiffen the asphalt binder, favorably retard the kinetics of oxidation reactions and interact with oxidation products to reduce their deleterious effects, alter the plastic properties of clay fines and other aggregate materials to improve their moisture sensitivity and durability, and/or improve resistance to fracture growth and propagation at low temperature (an important consideration where asphalt may undergo many freeze-thaw cycles over the course of the year, which is common in, e.g., the western United States).

When hydrated lime is used as an anti-stripping agent, it is typically present at rates of about 1 wt % of the aggregate material. Because the aggregate material is generally about 95 wt % of the finished HMA, the hydrated lime is thus present at rates of about 0.95 wt % of the finished HMA. Hydrated lime in these quantities may, in many cases, not provide sufficient anti-stripping performance in environments that are particularly prone to stripping, such as climates that are particularly hot and wet (e.g. the southern United States) or particularly cold and dry (e.g. much of the western United States), but increasing the lime addition rates beyond about 1 wt % of the aggregate may cause other undesirable physical or chemical effects on the aggregate and/or HMA. The use of hydrated lime, dry lime, or other anhydrous material up to and/or beyond these rates may also increase the cost and complexity of the HMA manufacturing process.

There is thus a need in the art for methods and systems providing anti-stripping properties in HMA equal or superior to those achieved by conventional hydrated lime addition processes, while allowing for lower addition rates of hydrated lime, dry lime, or other anhydrous material than are currently practiced.

SUMMARY OF THE INVENTION

It is one aspect of the present invention to provide a method for manufacturing an enhanced asphalt composition, comprising providing an asphalt composition container; adding an aggregate to the asphalt composition container, the aggregate comprising between about 0.1 wt % and about 1 wt % of a calcium composition; adding a binder to the asphalt composition container, the binder comprising between about 0.01 wt % and about 0.15 wt % of a silane additive; and mixing the aggregate and the binder together under heat for a predetermined length of time to form the enhanced asphalt composition, wherein the silane additive comprises benzyl alcohol and at least one organosilane, and wherein the calcium composition comprises at least one compound selected from the group consisting of calcium hydroxide, calcium oxide, an anhydrous calcium silicate, and anhydrous calcium sulfate.

It is another aspect of the present invention to provide an enhanced asphalt composition, comprising an aggregate, comprising between about 0.1 wt % and about 1 wt % of a calcium composition; and a binder, comprising between about 0.01 wt % and about 0.15 wt % of a silane additive, wherein the silane additive comprises benzyl alcohol and at least one organosilane, and wherein the calcium composition comprises at least one compound selected from the group consisting of calcium hydroxide, calcium oxide, an anhydrous calcium silicate, and anhydrous calcium sulfate.

It is another aspect of the present invention to provide an enhanced asphalt manufacturing system, comprising an asphalt receptacle; at least one heating element, configured to heat the asphalt receptacle and contents inside the asphalt receptacle; an enhanced asphalt composition disposed inside the asphalt receptacle, the enhanced asphalt composition comprising an aggregate, comprising between about 0.1 wt % and about 0.75 wt % of a calcium composition; and a binder, comprising between about 0.01 wt % and about 0.15 wt % of a silane additive; and a dispensing applicator, operatively interconnected with the asphalt receptacle and configured to convey the enhanced asphalt composition from the asphalt receptacle to a work surface, wherein the silane additive comprises benzyl alcohol and at least one organosilane, and wherein the calcium composition comprises at least one compound selected from the group consisting of calcium hydroxide, calcium oxide, an anhydrous calcium silicate, and anhydrous calcium sulfate.

In embodiments, the calcium composition and a remainder of the aggregate may be added to the asphalt composition container separately and/or the silane additive and a remainder of the binder may be added to the asphalt composition container separately.

In embodiments, a ratio of a weight of the aggregate to a weight of the binder may be about 19:1.

In embodiments, the silane additive may comprise between about 23 wt % and about 70 wt % of the at least one organosilane and between about 25 wt % and about 75 wt % of benzyl alcohol.

In embodiments, the silane additive may further comprise ethylene glycol, for example between about 1 wt % and about 5 wt % ethylene glycol.

In embodiments, the providing step may be carried out before either of the adding steps and both of the adding steps may be carried out before the mixing step.

In embodiments, any two steps may be carried out substantially simultaneously.

In embodiments, the binder may comprise between about 0.03 wt % and about 0.1 wt % of the silane additive, for example about 0.05 wt % of the silane additive.

The advantages of the present invention will be apparent from the disclosure contained herein. The embodiments and configurations described herein are neither complete nor exhaustive. As will be appreciated, other embodiments of the invention are possible utilizing, alone or in combination, one or more of the features set forth above or described in detail below.

DETAILED DESCRIPTION OF THE INVENTION

Figure 1:
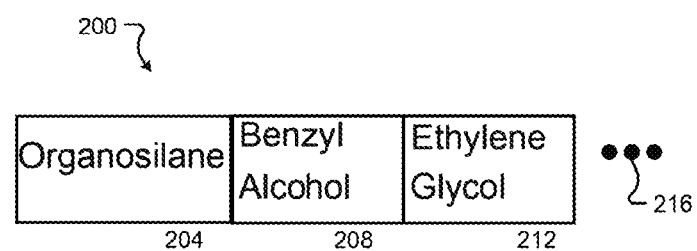
FIG. 1 is a block diagram of a silane additive compound, in accordance with embodiments of the present disclosure.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

As used herein, the term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

As used herein, the term "aggregate" refers to any coarse particulate material used in construction, including but not limited to crushed stone, gravel, sand, silt, slag, recycled concrete, geosynthetic aggregates, and clay.

As used herein, the terms "asphalt" refers to a composite material, comprising an aggregate and a binder, used in construction projects including but not limited to road surfaces, parking lots, and airports.

As used herein, the term "automatic" refers to any process or operation that is typically conducted continuously or semi-continuously with little or no human input during the process or operation.

As used herein, the terms "binder" and "binding agent" are interchangeable and each refer to any material or substance that holds or draws together an aggregate to form an asphalt.

As used herein, the term "bulk asphalt" refers to asphalt provided in large quantities, typically by dump truck.

As used herein, the term "computer-readable signal medium" refers to any computer-readable medium that is not a computer-readable storage medium and that can communicate, propagate, or transport a program for use by or in connection with an instruction execution system, apparatus, or device. A computer-readable signal medium may include a propagated data signal with computer-readable program code embodied therein, such as in baseband or as part of a carrier wave, and the program code may be transmitted by any appropriate medium, including but not limited to wireless media, wireline media, optical fiber cable media, radio frequency media, and any combination thereof.

As used herein, the term "computer-readable storage medium" refers to any tangible medium that can contain or store a program for use by or in connection with an instruction execution system, apparatus, or device. Examples of computer-readable storage media as that term is used herein include, but are not limited to, an electrical connection having one or more wires, a portable computer diskette, a hard disk, a random-access memory (RAM), a read-only memory (ROM), an erasable programmable read-only memory (EPROM, also known as Flash memory), an optical fiber, a portable compact disc read-only memory (CD-ROM), an optical storage device, a magnetic storage device, and any combination thereof.

As used herein, the term "organosilane" refers to any chemical compound that is an organic derivative of a silane and contains at least one bond between a carbon atom and a silicon atom.

As used herein, the term "roadway" refers to any road or path of any capacity, private or public, having any one of various pavement compositions, including but not limited concrete, asphalt, asphalt concrete, and reclaimed asphalt pavement.

In general, embodiments of the present disclosure provide methods, devices, compounds, and systems that, among other advantageous effects, improve the water susceptibility of asphalt, improve the strength and durability of the asphalt, and reduce the quantity of hydrated lime, dry lime, or other anhydrous material required to achieve these benefits. In some embodiments, the systems and/or methods comprise the addition of a silane additive, e.g. an organosilane, to the asphalt materials to provide improved physical and chemical properties and enhance the beneficial effects of the hydrated lime, dry lime, or other anhydrous material.

Referring now to FIG. 1, a silane additive 200 in accordance with embodiments of the present disclosure is illustrated. It is one aspect of the present disclosure to provide improved asphalt materials comprising the silane additive 200 mixed with hydrated lime, dry lime, or other anhydrous material and conventional aggregate and binder materials. The silane additive 200 may comprise one or more of an organosilane 204, a benzyl alcohol 208, an ethylene glycol 212, and other compounds, solvents, or additives 216. In embodiments, the silane additive 200 may comprise an organosilane 204 mixed with benzyl alcohol 208. In additional embodiments, the silane additive 200 may comprise an organosilane 204 mixed with benzyl alcohol 208 and ethylene glycol 212; a non-limiting example of such embodiments is the silane additive manufactured by Zydex® Industries under the trade name ZycoTherm™.

Figure 2:
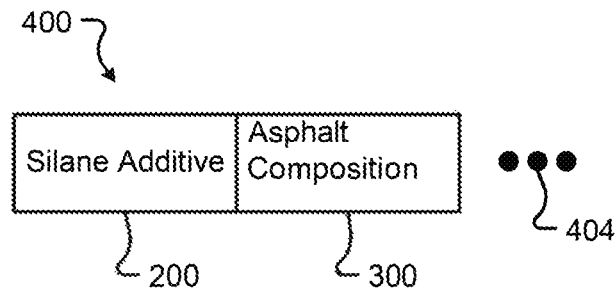
FIG. 2 is a block diagram of an enhanced asphalt composition having improved anti-stripping properties, in accordance with embodiments of the present disclosure.

Referring now to FIG. 2, an enhanced asphalt composition 400 in accordance with embodiments of the present disclosure is illustrated. The enhanced asphalt composition 400 may comprise a silane additive 200, e.g. as described in conjunction with FIG. 1, combined with an asphalt composition 300 and/or one or more other additives 404. The asphalt composition 300 will generally comprise an asphalt/bitumen binder and an aggregate, and, in embodiments, the binder will in turn comprise hydrated lime, dry lime, or another anhydrous material. In some embodiments, the enhanced asphalt composition 400 may be made in accordance with the method of manufacturing described in conjunction with FIG. 3.

Figure 3:
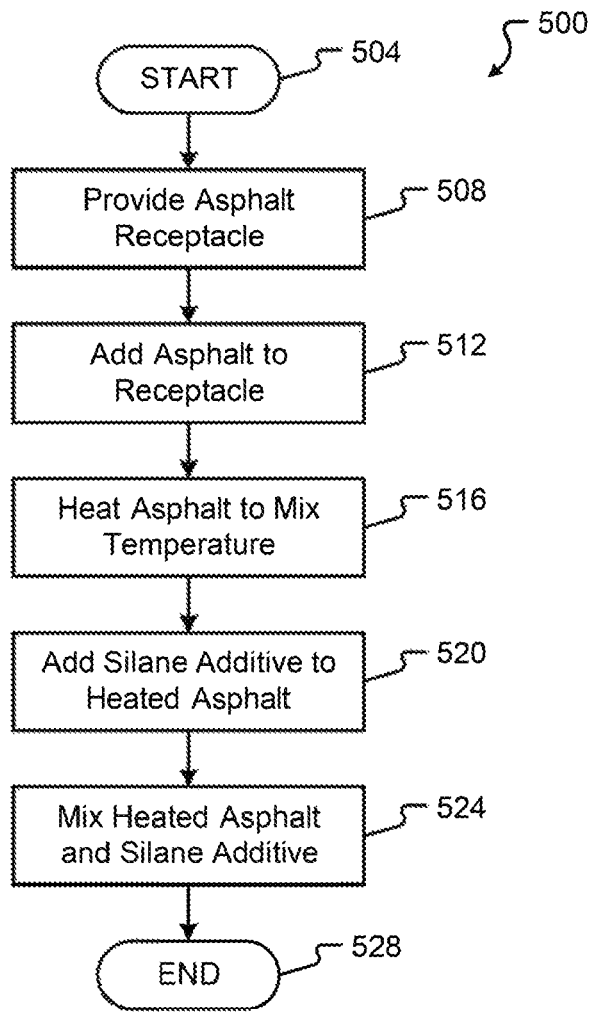
FIG. 3 is a flow diagram of a method for manufacturing asphalt having improved anti-stripping properties, in accordance with embodiments of the present disclosure.

Referring now to FIG. 3, a method 500 for manufacturing an enhanced asphalt composition 400 in accordance with embodiments of the present disclosure is illustrated. The method 500 begins at step 504 and, in step 508, an asphalt receptacle is provided. The asphalt receptacle may comprise at least one of a mixing container, a drum, a pot, a cart, and any other device system configured to hold, heat, and/or mix various components of the enhanced asphalt composition, e.g. any one or more of the aggregate, the binder, the hydrated lime/dry lime/other anhydrous material, and the silane additive 200. In embodiments, the asphalt receptacle may be similar or identical to the asphalt receptacle 804 illustrated in FIG. 4 and described in further detail below. The asphalt receptacle may, but need not, be a hot mix asphalt manufacturing plant or a part thereof.

In step 512 of the method, an asphalt composition is provided in the asphalt receptacle; the asphalt composition may be already mixed and simply added to the asphalt receptacle, or the various components of the asphalt composition other than the silane additive 200, e.g. the aggregate, the binder, and the hydrated lime/dry lime/other anhydrous material, may be added separately to the asphalt receptacle and then mixed and/or heated in the asphalt receptacle to form the asphalt composition. In some embodiments, the asphalt composition may be automatically added to the asphalt receptacle via a dispensing element associated with an automated enhanced asphalt manufacturing system (see, e.g., FIG. 4), but in any event a preselected amount, e.g. an amount defined by weight, of the asphalt composition is provided, and the asphalt receptacle may be sized to receive the preselected amount of the asphalt composition.

In step 516 of the method, the asphalt composition is heated to between about 260° F. and about 350° F. In some embodiments, the asphalt composition may be heated as described in this paragraph, while in other embodiments the asphalt composition may not be heated until the silane additive 200 and/or other additional materials are added in step 520, but in any event the asphalt composition and/or silane additive 200 are/is heated to a target temperature value or range. The heating of the materials may be provided by one or more heating elements associated with the asphalt receptacle. In embodiments, the temperature of the mix may be observed via one or more temperature sensors (thermocouples, etc.) and/or maintained by a controller monitoring sensed temperature data inside the asphalt receptacle and controlling the one or more heating elements associated with the asphalt receptacle.

In step 524 of the method, the asphalt composition and the silane additive 200, e.g. a mixture of organosilane(s), benzyl alcohol, and ethylene glycol, are mixed inside the asphalt receptacle for a preselected length of time to form the enhanced asphalt composition 400; by way of non-limiting example, the preselected length of time can be between about two seconds and about two days. The temperature of the mixed asphalt composition and silane additive 200 may be maintained at one or more of the temperatures and/or temperature ranges described above. In some embodiments, the organosilane(s) may be the active ingredient of the silane additive 200 and other substances, e.g. benzyl alcohol and/or ethylene glycol, may function as solvents designed to decrease the viscosity of the silane additive 200, while in other embodiments the other substances are themselves active ingredients instead of or in addition to their function as solvents. The method then ends at step 528, and the enhanced asphalt composition 400 is ready for use.

In preferred embodiments, the silane additive 200 may comprise one or more organosilanes and benzyl alcohol, and in some of these embodiments the silane additive 200 additionally comprise ethylene glycol. In these preferred embodiments, the one or more organosilanes are generally present in an amount of between about 23 wt % and about 70 wt % of the silane additive 200; the benzyl alcohol is generally present in an amount of between about 25 wt % and about 75 wt % of the silane additive 200; and the ethylene glycol, if present, is generally present in an amount of no more than about 5 wt % of the silane additive 200. In a first preferred embodiment, the silane additive 200 comprises between about 23 wt % and about 27 wt % organosilane(s), between about 72 wt % and about 74 wt % benzyl alcohol, and between about 1 wt % and about 2 wt % ethylene glycol. In a second preferred embodiment, the silane additive 200 comprises between about 23 wt % and about 27 wt % organosilane(s), about 75 wt % benzyl alcohol, and about 4 wt % ethylene glycol. In a third preferred embodiment, the silane additive 200 comprises between about 25 wt % and about 27 wt % organosilane(s), between about 72 wt % and about 74 wt % benzyl alcohol, and between about 1 wt % and about 2 wt % ethylene glycol. In a fourth preferred embodiment, the silane additive 200 comprises about 33 wt % organosilane(s) and about 67 wt % benzyl alcohol. In a fifth preferred embodiment, the silane additive 200 comprises about 67 wt % organosilane(s) and about 33 wt % benzyl alcohol. In a sixth preferred embodiment, the silane additive 200 comprises between about 65 wt % and about 70 wt % organosilane(s), between about 25 wt % and about 27 wt % benzyl alcohol, and between about 3 wt % and about 5 wt % ethylene glycol.

The present inventors have unexpectedly found that the use of the silane additive 200 in the enhanced asphalt compositions 400 of the present invention, in combination with hydrated lime, dry lime, or other anhydrous material, allows for smaller quantities of both the silane additive 200 and the hydrated lime, dry lime, or other anhydrous material to be used, while still achieving advantageous and beneficial anti-stripping properties and other desirable properties in the enhanced asphalt composition 400. By way of non-limiting example, in previous conventional asphalt compositions that comprise about 95 wt % aggregate and about 5 wt % binder, hydrated lime has typically been used at rates of about 1 wt % of the aggregate (i.e. about 0.95 wt % of the asphalt composition), and the silane additive 200 has typically been used at rates of about 0.1 wt % of the binder (i.e. about 0.005 wt % of the asphalt composition) but as much as about 0.2 wt % of the binder (i.e. about 0.01 wt % of the asphalt composition). The present inventors have found that advantageous anti-stripping effects can be achieved when the quantities of both the hydrated lime/dry lime/other anhydrous material and the silane additive 200 are reduced by at least half, such that the hydrated lime/dry lime/other anhydrous material is present as about 0.5 wt % or less of the aggregate (i.e. about 0.475 wt % or less of the asphalt composition) and the silane additive 200 is present as about 0.05 wt % or less of the binder (i.e. about 0.0025 wt % or less of the asphalt composition). These results can be obtained with unmodified hydrated lime, dry lime, or other anhydrous material, and commercially available silane additive products, including but not limited to ZycoTherm™.

Embodiments of the present invention allow for the use of the silane additive 200 in an amount between about 0.01 and about 0.15 wt % of the binder (or between about 0.0005 and about 0.075 wt % of the asphalt composition), more preferably between about 0.03 and about 0.1 wt % of the binder (or between about 0.015 and about 0.05 wt % of the asphalt composition), and most preferably about 0.05 wt % of the binder (or about 0.0025 wt % of the asphalt composition). Alternatively, the silane composition may be present in an amount about equal to any hundredth of one weight percent of the binder between 0.01 wt % and 0.15 wt %, i.e. about 0.15 wt %, about 0.14 wt %, about 0.13 wt %, about 0.12 wt %, about 0.11 wt %, about 0.1 wt %, about 0.09 wt %, about 0.08 wt %, about 0.07 wt %, about 0.06 wt %, about 0.05 wt %, about 0.04 wt %, about 0.03 wt %, about 0.02 wt %, or about 0.01 wt %.

Embodiments of the present invention further allow for the use of the hydrated lime, dry lime, or other anhydrous material in an amount between about 0.1 and about 1 wt % of the aggregate (or between about 0.095 and about 0.95 wt % of the asphalt composition), more preferably between about 0.3 and about 0.75 wt % of the aggregate (or between about 0.285 and about 0.7125 wt % of the asphalt composition), and most preferably about 0.5 wt % of the aggregate (or about 0.475 wt % of the asphalt composition). Alternatively, the hydrated lime, dry lime, or other anhydrous material may be present in an amount about equal to any twentieth of one weight percent of the aggregate between 0.1 wt % and 1 wt %, i.e. about 1 wt %, about 0.95 wt %, about 0.9 wt %, about 0.85 wt %, about 0.8 wt %, about 0.75 wt %, about 0.7 wt %, about 0.65 wt %, about 0.6 wt %, about 0.55 wt %, about 0.5 wt %, about 0.45 wt %, about 0.4 wt %, about 0.35 wt %, about 0.3 wt %, about 0.25 wt %, about 0.2 wt %, about 0.15 wt %, or about 0.1 wt %.

Figure 4:
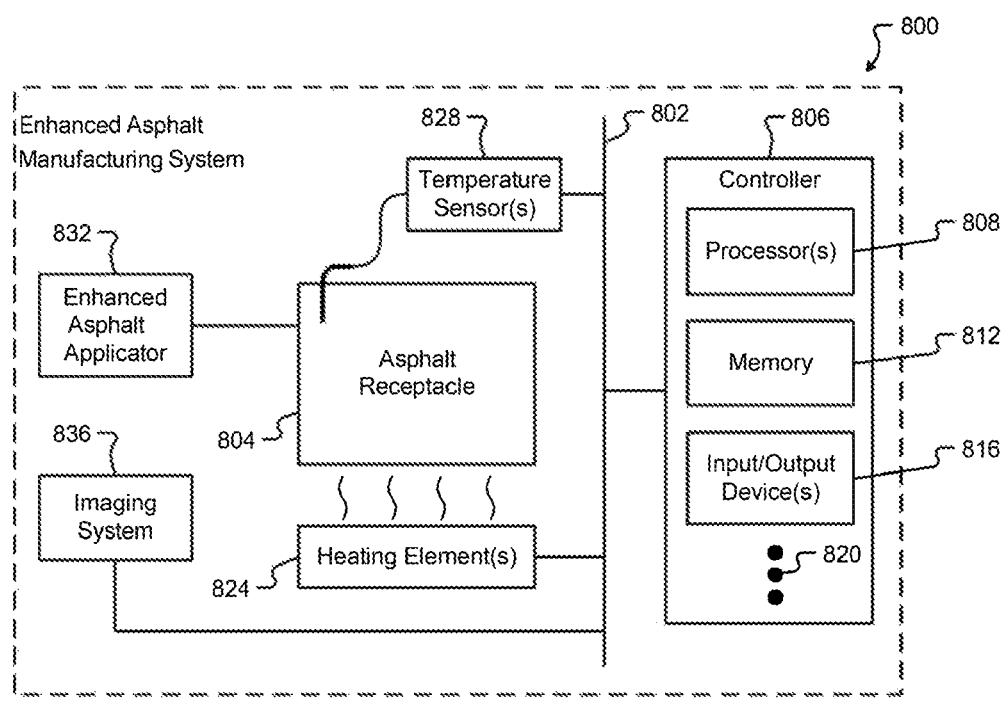
FIG. 4 is a block diagram of a system for manufacturing asphalt having improved anti-stripping properties in accordance with embodiments of the present disclosure.

Referring now to FIG. 4, an enhanced asphalt manufacturing system 800 in accordance with embodiments of the present disclosure is illustrated. The enhanced asphalt manufacturing system 800 may correspond to any device, machine, or process configured to make (i.e. manufacture), apply, and/or monitor the enhanced asphalt composition 400 described above. As illustrated, the enhanced asphalt manufacturing system 800 comprises various hardware elements that may be electrically coupled via a bus 802. These hardware elements may include, by way of non-limiting example, a controller 806 having one or more processors 808, a memory 812, one or more input/output devices 816, and/or other controller elements 820. In some embodiments, the hardware elements may include an asphalt receptacle 804, one or more heating elements 824, at least one temperature sensor 828, an enhanced asphalt applicator 832, and/or an imaging system 836.

The controller 806 may correspond to a programmable logic controller (PLC), a proportional integral derivative (PID) controller, a computer system, and/or any similar device or system. The controller 806 may comprise a general-purpose programmable processor or controller for executing application programming or instructions related to the enhanced asphalt manufacturing system 800. Furthermore, the controller 806 can perform operations for configuring and transmitting and/or receiving information as described herein. The controller 806 may include multiple processor cores and/or implement multiple virtual processors; optionally, the controller 806 may include multiple physical processors. By way of non-limiting example, the controller 806 may comprise a specially configured application-specific integrated circuit (ASIC) or other integrated circuit, one or more digital signal processors, a controller, a hardwired electronic or logic circuit, a programmable logic device or gate array, a special-purpose computer, and/or any similar device or system. In some embodiments, the controller 806 may be configured to execute any one or more of various functions, including but not limited to operating the asphalt receptacle at a specified temperature, controlling the asphalt receptacle temperature (e.g. by controlling the one or more heating elements 824), automatically applying the enhanced asphalt composition 400 via an interconnected enhanced asphalt applicator 832, and monitoring an output from the applicator 832 (e.g. via the imaging system 836).

The memory 812 may correspond to a data storage medium, e.g. a computer-readable storage medium, that stores instructions used by the processor 808 for processing information provided by the heating elements 824, temperature sensors 828, and imaging system 836 of the enhanced asphalt manufacturing system 800. In some embodiments, the memory 812 may comprise at least one of a disk drive, an optical storage device, a solid-state storage device, a random-access memory (RAM) module, and a read-only memory (ROM) module. The memory 812 may be modifiable, e.g. programmable and/or flash-updateable.

The input/output devices 816 may correspond to one or more ports through which the controller 806 can send and receive data. By way of non-limiting example, the controller 806 may be configured to send control instructions via the input/output devices 816, and/or the controller 806 may receive information (e.g. temperature information detected by the temperature sensors 828 and/or imaging information detected by the imaging system 836) from the various components of the enhanced asphalt manufacturing system 800.

The heating elements 824 may comprise at least one of an induction heater, a coil heater, a heating rod, a burner, a flame, an infrared heater, and any other heating system operatively associated with the asphalt receptacle 804. The asphalt receptacle 804 may be a drum, a pot, a bucket, or any other container that is configured to hold asphalt, e.g. the enhanced asphalt composition 400. The heating elements may be disposed in, around, outside, and/or adjacent to the asphalt receptacle 804 in an arrangement useful for heating contents inside the asphalt receptacle 804.

The temperature sensors 828 may include contact elements (e.g. thermocouples), contactless elements (e.g. infrared imaging sensors), or both, configured to measure a temperature of a material inside the asphalt receptacle 804. In some embodiments, the temperature sensors 828 may provide temperature information to the controller 806, in response to which the controller 806 may determine whether to control the one or more heating elements 824 to adjust a temperature of the material inside the asphalt receptacle 804; a feedback loop may thereby be formed.

The enhanced asphalt applicator 832 may correspond to a dispensing head, a gated spout, a valve, and/or any other automatically movable element configured to dispense the enhanced asphalt composition 400 from the asphalt receptacle 804. In some embodiments, the enhanced asphalt applicator 832 may be manually actuated to dispense the enhanced asphalt composition 400 from the asphalt receptacle 804, but in any event, the enhanced asphalt applicator 832 may be operatively connected to the asphalt receptacle 804 via one or more fluid lines.

The imaging system 836 may include one or more components configured to detect image information associated with enhanced asphalt composition 400 dispensed from the asphalt receptacle 804 via the applicator 832. In some embodiments, the imaging system 836 may comprise, by way of non-limiting example, any one or more of a lens, a filter, an image sensor, and a digital image processor.

Among other benefits, the compositions, methods, and systems disclosed herein provide improved anti-stripping performance of asphalt compositions while allowing for the quantities of silane additive materials and hydrated lime, dry lime, or other anhydrous material to be reduced by at least 50% relative to compositions of the prior art. The disclosed compounds, methods, and systems are thus cheaper and easier to implement than conventional asphalts and provide equal or even superior asphalt performance. Other benefits may include, but are not limited to, improved viscosity and workability of asphalt compositions, improved moisture resistance of asphalt compositions, and easier and/or more rapid equipment cleanup.

It is to be expressly understood that in addition to hydrated lime and dry lime, any other anhydrous material is suitable for use in the present invention, in place of or in addition to hydrated lime and/or dry lime. Most typically, anhydrous materials used in the present invention comprise at least one calcium compound, commonly an anhydrous calcium silicate or anhydrous calcium sulfate (also known as anhydrite). A non-limiting example of an anhydrous material suitable for use in the present invention is the blend of calcium silicates, calcium sulfate, and other anhydrous minerals manufactured by GCC of America, Inc. under the trade name Versabind®.

While the exemplary embodiments illustratively described herein generally describe various system components as collocated, certain components can be located remotely, either as distant portions of a distributed network (e.g. a local area network or the Internet) or within a dedicated system. It is to be appreciated that various components of the system can be combined into one or more devices, including but not limited to a server or a communication device, or collocated on a node of a distributed network, including but not limited to an analog telecommunications network, a digital telecommunications network, a packet-switched network, or a circuit-switched network. As described herein, the components of the system can, for reasons of computational efficiency, be arranged at any location within a distributed network of components without affecting the operation of the system.

It is to be appreciated that links connecting various elements can be wired, wireless, or any combination thereof, or may comprise any other known or later developed element that is capable of supplying and/or communicating data to and from the connected elements. Such wired or wireless links can be secure links and may be capable of communicating encrypted information. Transmission media used as links can be any suitable carrier of electrical signals, including but not limited to coaxial cables, copper wire, and fiberoptic cable. Links may also take the form of sound or light waves, such as, by way of non-limiting example, radio or infrared communications.

In embodiments, systems and methods of this disclosure can be implemented in conjunction with any one or more of a special-purpose computer, a programmed microprocessor or microcontroller and one or more peripheral integrated circuit elements, an ASIC or other integrated circuit, a digital signal processor, a hardwired electronic or logic circuit such as a discrete element circuit, a programmable logic device or gate array, a special-purpose computer, and any similar or comparable device or system. In general, any device or means capable of implementing the methods illustratively described herein can be used to implement the various aspects of the disclosure. Exemplary hardware that can be used in conjunction with the present disclosure may include, by way of non-limiting example, computers, handheld devices, telephones, and other hardware known in the art. Some of these devices include one or more processors, memory, nonvolatile storage, input devices, and output devices. Alternative software implementations, including but not limited to distributed processing, parallel processing, and virtual machine processing can be employed to implement the methods described herein.

The methods disclosed herein may readily be implemented in conjunction with software using object or object-oriented software development environments that provide portable source code capable of implementation on a variety of computer or workstation platforms. Alternatively, the disclosed methods and systems may be implemented, in whole or in part, in hardware, using standard logic circuits or very-large-scale integration (VLSI) design. Whether software or hardware is used to implement various components or steps in accordance with this disclosure will depend on the speed and/or efficiency requirements of the system, the function of the component or step, and the software or hardware systems, microprocessor systems, or microcomputer systems being utilized.

In embodiments, the methods disclosed herein may be at least partially implemented in software that can be stored on a computer-readable storage medium and executed on a programmed general-purpose computer with the cooperation of at least one of a controller and a memory, a special purpose computer, a microprocessor, and any similar device or system. In these embodiments, the systems and methods described herein can be implemented as a program embedded on a personal computer (such as an applet or a Java or Common Gateway Interface (CGI) script), a resource residing on a server or computer workstation, a routine embedded in a dedicated measurement system or system component, or any similar implementation. The system can also be implemented by physical incorporation into a software and/or hardware system.

Although the present disclosure describes components and functions implemented in the embodiments with reference to certain standards and protocols, the disclosure is not limited to such standards and protocols; other similar and/or comparable standards and protocols not explicitly identified in this disclosure are nonetheless within the scope of the disclosure. Moreover, standards and protocols identified herein, and other similar standards and protocols not specifically identified herein that currently exist, may periodically be superseded by faster or more effective equivalents having similar functions; such replacement standards and protocols are considered equivalent, and are within the scope of the present disclosure.

Any steps, functions, and operations disclosed herein may, but need not, be performed continuously and/or automatically.

The embodiments disclosed herein are exemplary embodiments of asphalt compositions and systems. The preceding description necessarily omits various known structures and devices, to avoid unnecessarily obscuring the inventive aspects of the disclosure. Such omissions are not to be construed as limitations on the scope of the disclosure; while specific details are set forth to provide an understanding of the disclosure, it is to be appreciated that the present disclosure may be practiced in ways not limited to those specified herein.

While the flowcharts of the present disclosure have been discussed and illustrated as depicting a certain sequence of events, it is to be appreciated that various changes, additions, and omissions to the steps of any sequence illustrated in a flowchart may be made without materially affecting operation of the disclosed embodiments.

Many variations and modifications of the disclosed embodiments may be employed, and it is possible to provide some features of embodiments described herein without providing others. Such variations, modifications, and omissions are within the scope of the present disclosure even if not explicitly stated herein.

The present disclosure, in various embodiments, configurations, and aspects, includes components, methods, processes, systems and/or apparatus substantially as depicted and described herein, including various embodiments, sub-combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description, for example, various features of the disclosure are grouped together in one or more embodiments, configurations, or aspects to streamline the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, regardless of whether such alternate, interchangeable and/or equivalent structures, functions, ranges, or steps are disclosed herein, and without intending to publicly dedicate any patentable subject matter.

The invention claimed is:

1. A method for manufacturing an enhanced asphalt composition, comprising:
providing an asphalt composition container;
adding an aggregate to the asphalt composition container, the aggregate comprising between about 0.1 wt % and 0.8 wt % of a calcium composition;
adding a binder to the asphalt composition container, the binder comprising between about 0.01 wt % and about 0.15 wt % of a silane additive; and
mixing the aggregate and the binder together under heat for a predetermined length of time to form the enhanced asphalt composition,
wherein the silane additive comprises benzyl alcohol and at least one organosilane, and
wherein the calcium composition comprises at least one compound selected from the group consisting of calcium hydroxide, calcium oxide, an anhydrous calcium silicate, and anhydrous calcium sulfate.

2. The method of claim 1, wherein the calcium composition and a remainder of the aggregate are added to the asphalt composition container separately and/or the silane additive and a remainder of the binder are added to the asphalt composition container separately.

3. The method of claim 1, wherein a ratio of a weight of the aggregate to a weight of the binder is about 19:1, wherein the silane additive comprises between about 23 wt % and about 70 wt % of the at least one organosilane and between about 25 wt % and about 75 wt % of benzyl alcohol, and wherein the silane additive further comprises between about 1 wt % and about 5 wt % ethylene glycol.

4. The method of claim 1, wherein the providing step is carried out before either of the adding steps and both of the adding steps are carried out before the mixing step.

5. The method of claim 1, wherein any two steps are carried out simultaneously.

6. The method of claim 1, wherein the binder comprises between about 0.03 wt % and about 0.1 wt % of the silane additive.

7. The method of claim 6, wherein the binder comprises about 0.05 wt % of the silane additive.

8. An enhanced asphalt composition, comprising:
an aggregate, comprising between about 0.1 wt % and 0.8 wt % of a calcium composition; and
a binder, comprising between about 0.01 wt % and about 0.15 wt % of a silane additive,
wherein the silane additive comprises benzyl alcohol and at least one organosilane, and
wherein the calcium composition comprises at least one compound selected from the group consisting of calcium hydroxide, calcium oxide, an anhydrous calcium silicate, and anhydrous calcium sulfate.

9. The composition of claim 8, wherein a ratio of a weight of the aggregate to a weight of the binder is about 19:1.

10. The composition of claim 8, wherein the silane additive comprises between about 23 wt % and about 70 wt % of the at least one organosilane and between about 25 wt % and about 75 wt % of benzyl alcohol.

11. The composition of claim 8, wherein the silane additive further comprises ethylene glycol.

12. The composition of claim 11, wherein the silane additive comprises between about 1 wt % and about 5 wt % ethylene glycol.

13. The composition of claim 8, wherein the binder comprises between about 0.03 wt % and about 0.1 wt % of the silane additive.

14. The composition of claim 13, wherein the binder comprises about 0.05 wt % of the silane additive.

15. An enhanced asphalt manufacturing system, comprising:
- an asphalt receptacle;
- at least one heating element, configured to heat the asphalt receptacle and contents inside the asphalt receptacle;
- an enhanced asphalt composition disposed inside the asphalt receptacle, the enhanced asphalt composition comprising:
  - an aggregate, comprising between about 0.1 wt % and about 0.75 wt % of a calcium composition; and
  - a binder, comprising between about 0.01 wt % and about 0.15 wt % of a silane additive; and
- a dispensing applicator, operatively interconnected with the asphalt receptacle and configured to convey the enhanced asphalt composition from the asphalt receptacle to a work surface,
- wherein the silane additive comprises benzyl alcohol and at least one organosilane, and
- wherein the calcium composition comprises at least one compound selected from the group consisting of calcium hydroxide, calcium oxide, an anhydrous calcium silicate, and anhydrous calcium sulfate.

16. The system of claim 15, wherein a ratio of a weight of the aggregate to a weight of the binder is about 19:1.

17. The system of claim 15, wherein the silane additive comprises between about 23 wt % and about 70 wt % of the at least one organosilane and between about 25 wt % and about 75 wt % of benzyl alcohol.

18. The system of claim 15, wherein the silane additive further comprises between about 1 wt % and about 5 wt % ethylene glycol.

19. The system of claim 15, wherein the binder comprises between about 0.03 wt % and about 0.1 wt % of the silane additive.

20. The system of claim 19, wherein the binder comprises about 0.05 wt % of the silane additive.

* * * * *